(12) United States Patent
Hagenburg et al.

(10) Patent No.: US 12,231,571 B2
(45) Date of Patent: Feb. 18, 2025

(54) CAMERA SYSTEM SECURITY CALIBRATION METHOD AND CAMERA POD ASSEMBLY

(71) Applicant: MOTHERSON INNOVATIONS COMPANY LIMITED, London (GB)

(72) Inventors: Kai Uwe Hagenburg, Stuttgart (DE); Michael Schad, Stuttgart (DE); Matthias Koller, Stuttgart (DE); Dimitri Majarle, Stuttgart (DE); Romel Davila, Stuttgart (DE); Andreas Herrmann, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 18/043,983

(22) PCT Filed: Sep. 15, 2021

(86) PCT No.: PCT/EP2021/075345
§ 371 (c)(1),
(2) Date: Mar. 3, 2023

(87) PCT Pub. No.: WO2022/058356
PCT Pub. Date: Mar. 24, 2022

(65) Prior Publication Data
US 2024/0283656 A1    Aug. 22, 2024

Related U.S. Application Data (60) Provisional application No. 63/078,549, filed on Sep. 15, 2020.

(51) Int. Cl.
*H04L 9/32* (2006.01)
*H04N 7/18* (2006.01)
*H04N 23/661* (2023.01)

(52) U.S. Cl.
CPC .......... *H04L 9/3239* (2013.01); *H04N 7/181* (2013.01); *H04N 23/661* (2023.01)

(58) Field of Classification Search
None
See application file for complete search history.

(56) References Cited

U.S. PATENT DOCUMENTS 10,812,257 B2 * 10/2020 Kong .................... H04L 9/3236
11,138,873 B1 * 10/2021 Clifford .................. G08G 1/04
(Continued)

FOREIGN PATENT DOCUMENTS

DE    102020204981 B4 *  4/2022 ............. G06F 21/32
EP    3444742              2/2019

OTHER PUBLICATIONS

Patent Cooperation Treaty, International Search Report and Written Opinion, PCT/EP2021/075345, Dec. 23, 2021.

*Primary Examiner* — Ricky Chin
(74) *Attorney, Agent, or Firm* — Jones Day (57) ABSTRACT

The present invention refers to a security setting method for a camera system of a vehicle comprising the steps of creating a camera system with at least a first camera module with a first identification number, a second camera module with a second identification number and an electronic control unit (ECU); creating at least one first camera module Hash value (H12) for the first identification number, at least one second camera module Hash value (H14) based on the second identification number and/or at least one camera pod assembly Hash value based on the first and second identification numbers; and storing the at least one of the Hash values. It also refers to a camera pod assembly comprising at least two camera modules to be attached to a vehicle via a mounting and being adapted for usage of such a security setting method; a camera system comprising at least one (Continued)

such camera pod assembly; and a vehicle comprising such a camera system.

49 Claims, 8 Drawing Sheets

(56) References Cited

U.S. PATENT DOCUMENTS

| | | |
|---|---|---|
| 2015/0295930 A1 | 10/2015 | Dixon et al. |
| 2019/0286947 A1* | 9/2019 | Abhiram .............. G06V 40/172 |
| 2019/0385269 A1* | 12/2019 | Zachary ................... H04N 7/18 |
| 2020/0174780 A1 | 6/2020 | Gintz et al. |
| 2021/0398045 A1* | 12/2021 | Hanebeck ........ G06Q 10/06315 |
| 2021/0405168 A1* | 12/2021 | Manglani .............. G01S 7/4972 |
| 2022/0247684 A1* | 8/2022 | Andersson ............ H04L 45/745 |
| 2022/0311747 A1* | 9/2022 | Khessin .............. H04L 63/0281 |
| 2022/0326703 A1* | 10/2022 | Raje ................... G05B 23/0283 |
| 2023/0256780 A1* | 8/2023 | Houston ............ H04W 12/069 |
| | | 701/29.4 |
| 2024/0283656 A1* | 8/2024 | Hagenburg ............. G06F 21/44 |

* cited by examiner

CAMERA SYSTEM SECURITY CALIBRATION METHOD AND CAMERA POD ASSEMBLY

CROSS-REFERENCE TO RELATED APPLICATIONS

This application is a is a National Stage Entry of International Patent Application No. PCT/EP2021/075345, filed on Sep. 15, 2021, which claims the benefit of priority to U.S. Provisional Application No. 63/078,549, filed on Sep. 15, 2020, each of which is hereby incorporated by reference in its entirety for all purposes.

FIELD OF THE INVENTION

The present disclosure relates generally to a security setting method for a camera monitoring system of a vehicle, a camera pod assembly being adapted for usage of such a security setting method, a camera system with such a camera pod assembly and a vehicle using such a camera system. More specifically, it is directed to a system calibration of individual elements for providing cybersecurity.

BACKGROUND

The statements in this section merely provide background information related to the present disclosure and may not constitute prior art.

Vehicles, such as passenger cars, vans and trucks, may include a camera monitoring system (CMS). Camera monitoring systems may be used to detect objects or provide images of the surrounding areas of a vehicle in support of safety systems or in place of rear view devices. CMS solutions typically use individual system calibrations due to component variations in order to meet mandated requirements and function properly. Typically this takes several calibration steps at different stages of production to assure accordance of the system with respect to norms and regulations. This approach also takes up assembly space and assembly time during vehicle manufacturing.

The camera monitoring system when used to replace a mirror for monitoring the vehicle surroundings becomes part of the safe operation of the vehicle. The camera monitoring system may be vulnerable to changes in the system integrity. The camera monitoring system may be compromised if one of the system components is damaged, defective or removed. This situation could lead to potential non-compliance with mandated regulation by the images produced by the camera monitoring system or leave the system open to cyberattacks.

It is the object of this disclosure to provide a calibration strategy for a CMS that overcomes at least some of the stated problems above.

SUMMARY

The object is achieved by claim 1. The sub-claims describe embodiments according to the present disclosure.

The present disclosure refers to a security setting method for a camera system of a vehicle comprising the steps of creating a camera system with at least a first camera module with a first identification number, a second camera module with a second identification number and an electronic control unit (ECU); creating at least one first camera module Hash value for the first identification number, at least one second camera module Hash value based on the second identification number and/or at least one camera pod assembly Hash value based on the first and second identification numbers; and storing at least one of the Hash values comprising storing the at least one first Hash value in the second camera module and the at least one second Hash value in the first camera module and/or storing the at least one camera pod assembly Hash value in the camera pod assembly and/or storing the at least one first Hash value and the at least one second Hash value as a pair and/or storing the at least one first Hash value and the at least one second Hash value in the ECU as a ECU Hash value.

According to one aspect the method further comprises the step(s) of encrypting at least one of the Hash values before storing and/or sending the at least one Hash value; and/or monitoring and/or validating the at least one first Hash value stored in the second camera module and the at least one second Hash value stored in the first camera module by matching with the ECU Hash values stored in the ECU; and/or transferring calibration data to the camera pod assembly and/or the camera modules and/or the ECU, wherein the transfer is via a wireless or wired connection.

It is proposed that the monitoring step occurs at vehicle start-up; and/or the calibration data of the transferring step are defined by an assigned calibration data set per camera module and/or the camera pod assembly, wherein each calibration data set is assigned to a specific calibration data identification number; and/or the transfer step is using a data transfer interface, which preferably enables data transfer standards in form of NFC, WLan, 5G, USB, Lin Bus, storage reader, Bluetooth or LAN.

Further the method may comprise the step(s) of displaying a warning if the ECU Hash values do not match the at least one first and second Hash values or Camera Pod Assembly Hash Value; and/or creating at least one calibration data Hash value for the at least one calibration data identification number and storing the at least one calibration data Hash value in the ECU and/or camera modules and/or camera pod assembly, with preferably displaying a warning if the at least one calibration data Hash value stored in at least one of the camera modules and/or the camera pod assembly does not match the at least one calibration data Hash value stored in the ECU.

It is also proposed that the method comprises the step(s) of storing at least one calibration data set in at least one storage device; and/or providing the camera pod assembly and at least one calibration data set, simultaneously or independently, wherein preferably at least one calibration data set and the camera pod assembly are delivered independently to an OEM. The storage device may be selected to comprise a cloud, a flash drive, a hard disk, a CD, a DVD, a printable Code, a chip and/or a mobile device.

At least one of the Hash values may comprise several identification numbers and/or several Hash values and/or parts of several identification numbers and/or parts of several Hash values; and/or the first and second Hash values may comprise additionally information about the calibration data set; and/or the first and second Hash values may comprise at least two Hash values, wherein at least one first Hash value determines the hardware modules of the camera pod assembly and at least one second Hash value determines the calibration data set; wherein preferably the matching performed during the step(s) of validating and/or monitoring and/or displaying a warning is based in addition on at least one calibration data Hash value, with the at least one calibration data Hash value in particular being stored at least partly in the ECU and/or in at least one of the camera modules and/or in the camera pod assembly.

According to one aspect it is proposed that the transferring of the calibration data is in form of a wireless transfer from the camera pod assembly to the ECU; and/or checking for calibration data updates, wherein preferably a warning is displayed, if an calibration data update is available, and/or transferring a new calibration data set to the camera pod assembly, at least one of the camera modules and/or the ECU as an update.

Still further it is proposed that the camera system comprises more than two camera modules and/or calibration data sets, for which respective Hash values are created, stored, monitored and validated; and/or at least two Hash values are combined, in particular into a single Hash value or a defined list of Hash values; and/or at least one of the Hash values comprises information about the stored calibration data set; and/or at least one identification number is a serial number; and/or storing at least one calibration data Hash value in each camera module, whereby the calibration data Hash values are cross stored in the camera modules such that each camera module has stored a calibration data Hash value that relates to another camera module.

The method according to the present disclosure may provide a system calibration method for the camera system, comprising a step for individual camera module calibration, a step for camera system calibration, and a step for vehicle camera calibration.

Said step for camera system calibration may comprise a step for storing assigned serial numbers of individual camera modules, a step of installing the camera modules in the camera system, a step for cross-storing and/or cross-validating the camera module pairing, a step for checking the existence of stored pairing values, a step for matching the Hash values, and a step for assigning the camera modules as calibrated.

In an aspect, the method may be adapted for monitoring camera monitoring system components for security parameters, comprising a step for checking the existence of stored pairing Hash values, a step for matching the Hash values, and a step for assigning the camera modules as calibrated, or a step displaying a camera calibration warning and/or a step for authorizing a re-calibration, wherein preferably it is subsequently returned to the step for checking the existence of stored pairing Hash values.

According to another aspect, at least one camera module or a camera pod assembly may be replaced by the following steps: replacing at least one camera module or camera pod assembly, creating a new Hash value of the replacement camera module or creating a new Hash value of the replacement camera pod assembly, creating new calibration data hash value of the replacement camera module or the replacement camera pod assembly, and replacing the old calibration data and Hash values with storing the new Hash values of the replacement camera module or the replacement camera pod assembly.

The method may also be adapted for calibrating a camera pod assembly and an ECU by using a database, comprising a step for storing the calibration data, a step for pairing the camera modules of the camera pod assembly, a step for creating a calibration database snapshot, a step of, in particular independently, delivering of the paired camera pod assembly, a display unit and the calibration database snapshot, a step for sending out information on the paring of the camera pod assembly and the display unit with the database snapshot, and a step for retrieving calibration data from the database snapshot and providing the same to the ECU.

The method may allow for a recalibration without transferring the calibration data from the camera pod assembly by a coaxial cable, wherein it comprises a step for checking the camera system and a step for checking the existence of data on the ECU, a step for checking the security of the camera system in case there are data on the ECU or a step for getting information data from the camera modules in case there are no data on the ECU but on the camera modules and a step for providing calibration data to the camera modules, in particular by wired or wireless connection, wherein preferably it is subsequently returned to the step for checking the camera system and the step for checking the existence of data on the ECU, a step for checking the serial numbers of the camera modules and/or the camera pod assembly, and a step for updating the calibration data of the ECU by the step of providing the calibration data to the ECU in case there are new serial numbers of the camera modules and/or the camera pod assembly, wherein preferably it is subsequently returned to the step for checking the camera system and the step for checking the existence of data on the ECU, or a step for using the camera modules without update in case there are no new serial numbers of the camera modules and/or the camera pod assembly.

A camera pod assembly comprising at least two camera modules to be attached to a vehicle via a mounting and being adapted for usage of the security setting method of the present disclosure is also provided. The storage device may have a flash drive, a hard disk, a CD, a DVD, a printable Code and/or a chip.

In addition, a camera system comprising at least one camera pod assembly of the present disclosure and the ECU is provided. The storage device may be provided by a cloud and/or a mobile device.

Still further, a vehicle comprising the camera system of the present disclosure and at least one display unit is provided. The ECU may be provided by the display unit.

It should be noted that the features set out individually in the following description can be combined with each other in any technically advantageous manner and set out other forms of the present disclosure. The description further characterizes and specifies the present disclosure in particular in connection with the Figures.

DRAWINGS

In order that the disclosure may be well understood, there will now be described various forms thereof, given by way of example, reference being made to the accompanying drawings, in which.

DETAILED DESCRIPTION

The following description is merely exemplary in nature and is not intended to limit the present disclosure, application, or uses. It is understood that throughout the drawings, corresponding reference numerals indicate corresponding parts and features.

Figure 1:
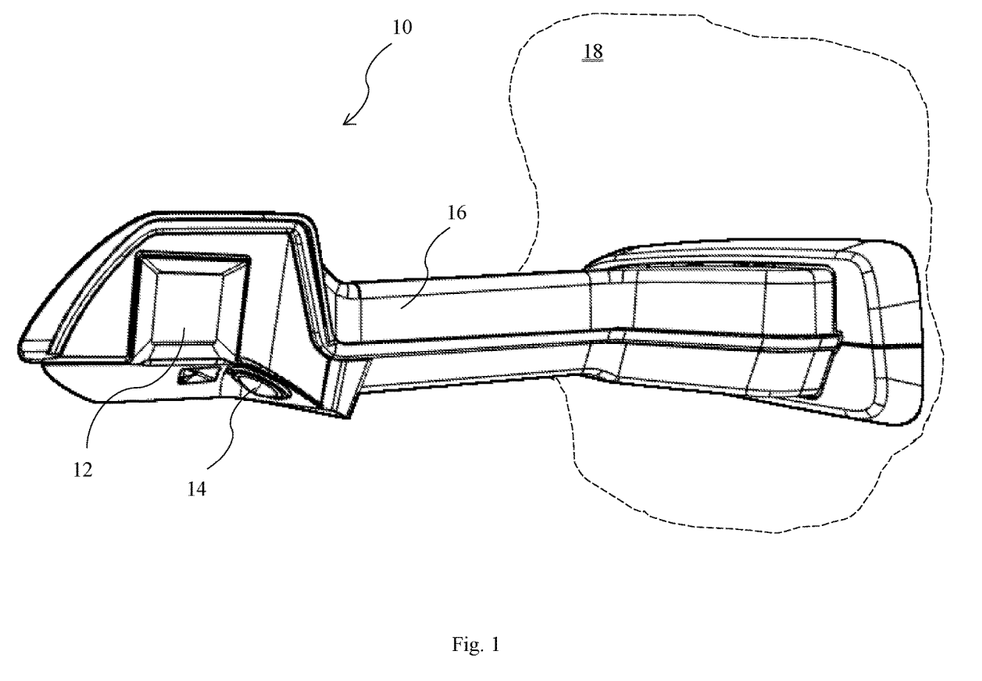
FIG. 1 depicts a front perspective view of an exemplary camera pod assembly according to the present disclosure.

FIG. 1 illustrates an exemplary camera pod assembly 10 on a vehicle 18. The camera pod assembly 10 includes a mounting element 16 which houses at least two camera modules 12, 14. In this form, the camera pod assembly 10 has a first camera module 12 and a second camera module 14. In other forms, the camera pod assembly 10 may contain more than two camera modules. The first camera module 12 and the second camera module 14, in this form, have different camera parameters such as field of view (FOV). It is within the scope of this disclosure that the camera module parameters may be identical. The exemplary camera pod assembly 10 shown in FIG. 1 is mounted on the exterior of vehicle 18. The camera pod assembly 10 may be located at any position on the vehicle exterior or be located in the vehicle interior and utilize the camera calibration method described in this disclosure.

Figure 2:
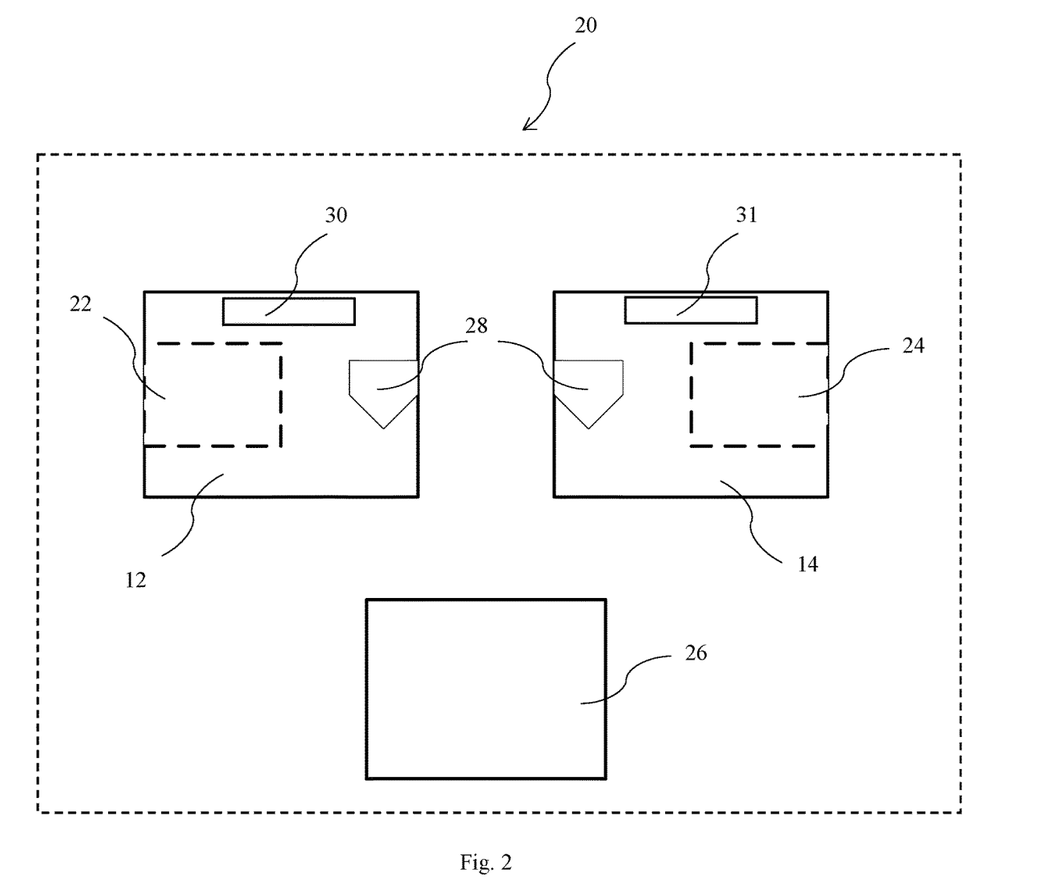
FIG. 2 schematically illustrates an example of the components of the camera system according to the present disclosure.

FIG. 2 illustrates the elements utilized for a camera system 20. The camera system 20 contains the at least two camera modules 12, 14 and an electronic control unit (ECU) 26. The camera system 20 is not necessarily a single structural assembly. The at least two camera modules 12, 14 have a camera flash memory 22, 24 respectively for storing a camera specific calibration based on characteristics of an installed lens system 30, 31. For example, the first camera module 12 contains a first camera module flash memory 22 for storing the internal calibration associated with a first lens system 30. The second camera module 14 contains a second camera flash memory 24 associated with a second lens system 31. This specific internal calibration is furthered discussed as part of step 200 with respect to FIG. 3 below. The first and second camera modules 12, 14 also each contain a system calibration memory storage 28. The system calibration memory storage 28 may be part of the camera flash memory 22, 24 or be a separate memory area as part of the camera module. The system calibration memory storage 28 may be a read/write memory storage e.g. capable of storing information received from the camera flash memory 22, 24 and/or an electronic control unit (ECU) 26 and sending information to the ECU 26 upon request. The ECU 26 receives information from the system calibration memory storage 28 and returns information to the camera modules 12, 14 for subsequent storage in the system calibration memory storage 28. Said information may contain data to identify calibration data. The ECU 26 comprises a storage device, which stores calibration data.

Figure 3:
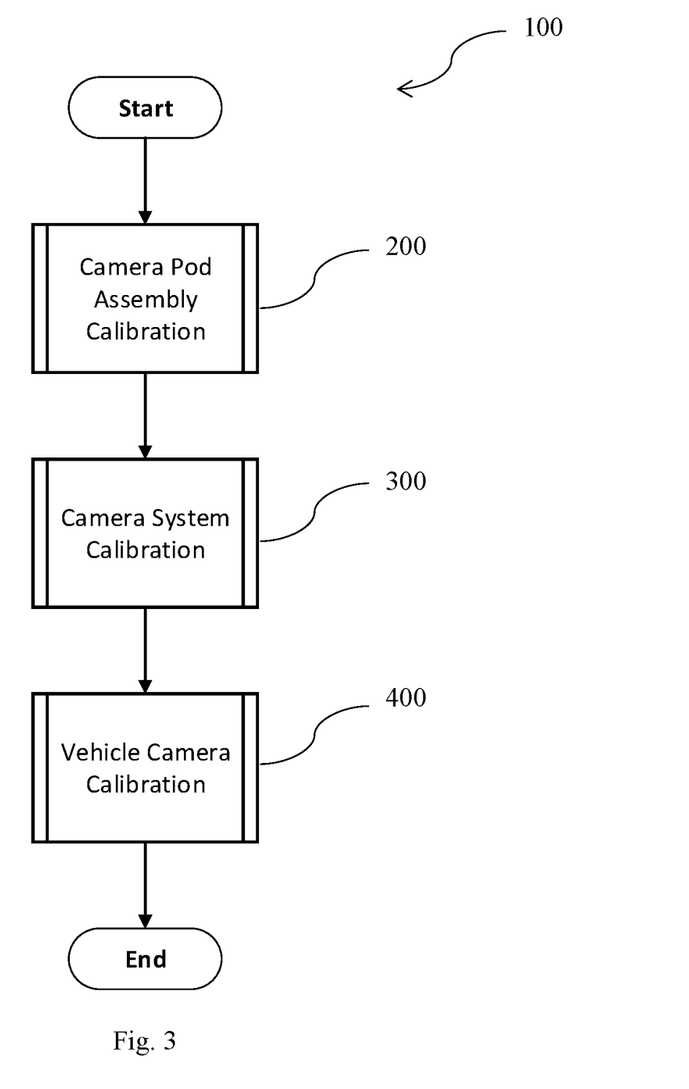
FIG. 3 illustrates an exemplary method for executing a system calibration method for a camera system of a vehicle.

FIG. 3 illustrates steps of a vehicle camera system calibration method 100. The method 100 calibrates the at least two camera modules 12, 14 in the camera pod assembly 10. Step 200 is a camera calibration step for individual camera calibration for the camera modules 12, 14 in the camera pod assembly 10. Each lens system 30, 31 includes a lens surface with a given curvature that allows for capturing a wide area or FOV in front of the respective camera which can also be described in terms of a viewing cone. As the FOV increases in terms of angle size of the viewing cone, a corresponding increase occurs in the curvature of the lens surface effecting the distortion of the captured FOV. The calibration in Step 200 approximates the lens distortions by a mathematical model in order to undistort the image. One application for this is, for example, that straight lines on a captured object are each also seen as a straight line after a post-processing step of the captured image.

The calibration of the first camera module 12 and the second camera module 14 may be done at the time the respective camera is manufactured and stored internal in the camera flash memory 22, 24 for use in Step 300. Furthermore, the calibration data may be stored in an additional storage device, which may be needed to transfer the calibration data to the storage device integrated in the ECU 26. The additional storage device may be a transportable device such as an USB flash drive or it may be a cloud. In certain embodiments the additional storage device will be delivered together with the camera pod assembly 10 or together with an element of the camera pod assembly 10, which has to be changed. In another embodiment, the additional storage device is a cloud and access to the appropriate data for the calibration data of the camera pod assembly 10 or an element of the camera pod assembly 10 are sent to an authorized service provider or the vehicle user as such in order to have access to the needed calibration data via the cloud.

Step 300 is the camera system calibration step used in the vehicle camera system calibration method 100. In Step 300, the at least two camera modules 12, 14 have already completed an individual camera module calibration stored from Step 200. Step 300 calibrates the camera pod assembly 10 to combine the individual images from the first and second camera modules 12, 14 and to produce a unified camera system image. In this form, the at least two camera modules 12, 14 with different viewing cones (i.e. different lenses) are combined in a camera pod assembly 10. For example, the first camera module 12 with a wide-angle FOV looks at the ground, covering a large area next to a vehicle and the second camera module 14 with a small-angle FOV looks at the area behind the vehicle 18. The first and second camera modules 12, 14 are positioned such that the camera modules in the camera pod assembly 10 have a shared visible viewing area. If the position and orientation of the camera modules are known, it is possible to calibrate the camera system 20 of a vehicle combining the multiple camera views into a unified view. The obtained calibration data may be stored in an additional storage device, which may be needed to transfer the calibration data to the storage device integrated in the ECU 26.

Step 300 comprise the so called extrinsic calibration which is effective between the camera pod assembly 10 and the vehicle 18 and/or further vehicle components. According to the present disclosure, the camera pod assembly 10 and a display unit and calibration database, which may be stored on an additional storage device, may be delivered independently to an OEM. The camera pod assembly 10 and a display unit (not shown) may be installed in a vehicle. Subsequently, the OEM retrieves the calibration data corresponding to the delivered camera pod assembly 10 and can provide these data to the storage device integrated in the ECU 26. Subsequently, the corresponding calibration data is stored on available storage on the ECU 26 on the long-term basis. The calibration data may be provided to the ECU 26 by air (flash over the air) or via a storage device and/or other data transfer means to the display unit. This may exclude the option, that the calibration data between the camera pod assembly 10 and the ECU 26 is retrieved by e.g. a coaxial cable. This provides a further security step, as an authorized service partner needs the separated calibration data for any repairing.

Step 400 comprises a final vehicle CMS calibration process. This is a calibration of parameters occurring when the camera pod assembly 10 has been assembled into a vehicle 18. The vehicle calibration in Step 400 allows for fine-tuning of the camera system 20 displayed images taking into consideration variation such as component tolerances. The obtained calibration data may be stored in an additional storage device, which may be needed to transfer the calibration data to the storage device integrated in the ECU 26.

Figure 4:
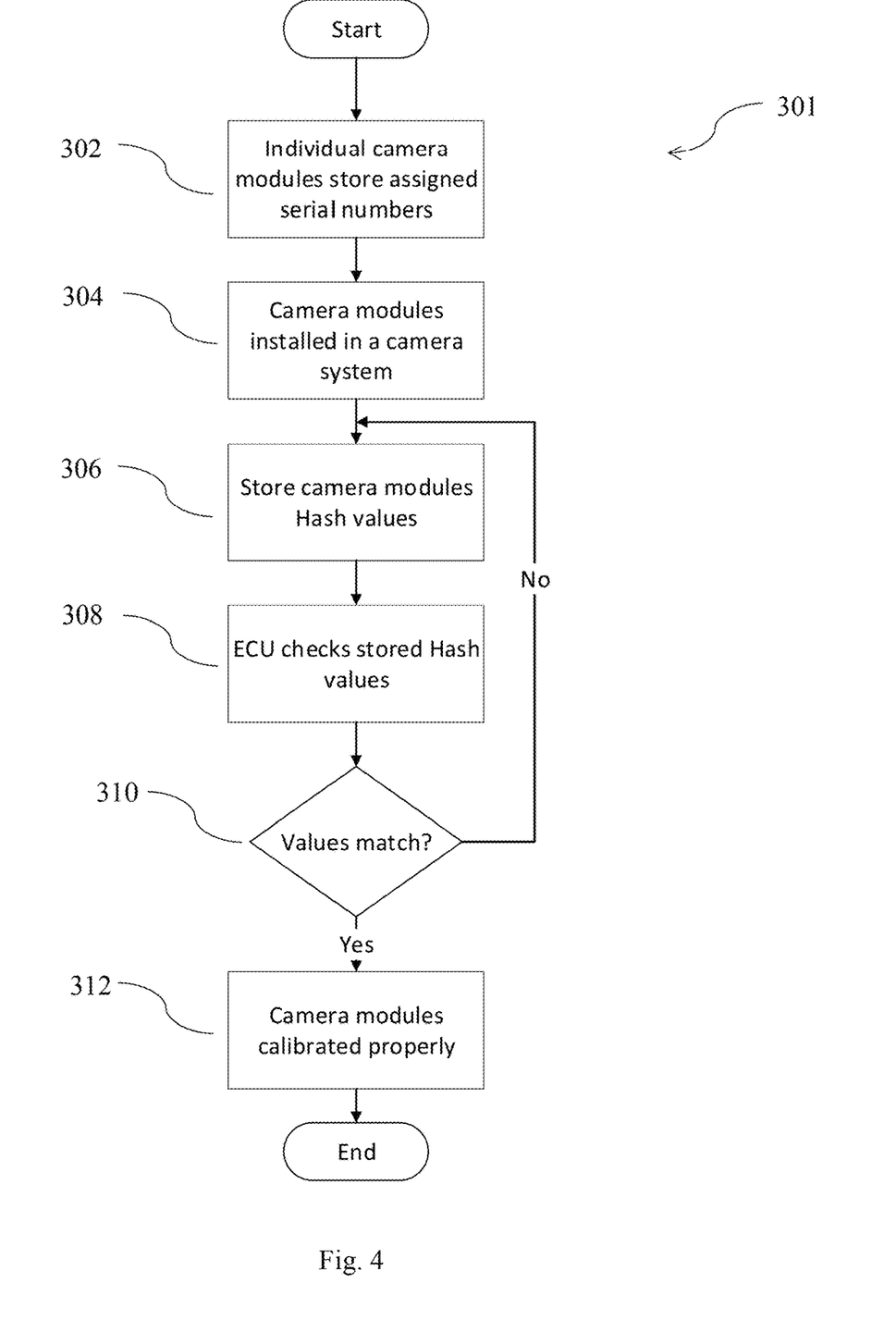
FIG. 4 illustrates an exemplary method for calibrating a camera monitoring system component security settings according to the present disclosure.

FIG. 4 illustrates an exemplary method for calibrating a camera monitoring system to provide for a camera module validation check. The validation calibration process 301 is a sub-process performed in Step 300 described above. The component validation calibration process 301 may also be implemented any time in the camera monitoring system after the at least two camera modules 12; 14 have been installed on the camera pod assembly 10 including an authorized component replacement service. The validation calibration process 301 provides a setting for the camera system 20 to individually verify that the currently installed camera modules in the camera pod assembly 10 are the same camera modules identified during the camera system calibration process 300. This validation calibration process 301 creates and stores a distinct identifier assigned to an individual camera for compliance and for cybersecurity reasons.

Cybersecurity for camera systems 20 of vehicles is a concern for vehicle operators as camera systems 20 are replacing conventional mirror systems in vehicles. Mirror replacements due to malfunctioning or damage can be replaced if there is the correct mechanical attachment for functionality. Replacing a camera module is more complicated. When a camera module is replaced, this may create issues with camera pod assembly calibration leading to image clarity issues and potential system security concerns. If a camera module is replaced and the calibration is not verified, the system may produce a scrambled view or uncompliant view with current safety mandated laws. A cybersecurity issue or misuse situation may also be created by providing unauthorized access to the camera system 20 with a replacement camera module 512. In order to maintain the overall camera system quality and security, the component validation calibration process 301 for camera modules in the camera pod assembly 10 allows camera system 20 to determine if an unauthorized replacement of at least one camera module has occurred and there has not been a corresponding authorized re-calibration of the camera system 20.

The validation calibration process 301 starts with the first camera module 12 having a first stored identification number in the associated first camera module flash memory 22 and the second camera module 14 having a second stored identification number, in the second camera module flash memory 24 (Step 302). Each identification number is a serial number in the following example, but may be a QR code or the like. In addition to the identification numbers of the camera modules itself, each camera module may have both associated calibration data, which may comprise one or more data sets, and at least one calibration data identification number, which relates to each of the installed camera modules and/or to the camera system calibration. These calibration data identification numbers may comprise information about the associated hardware and the creation date of the calibration data.

Each assigned serial number belongs to a specific camera module and is generated at the time the camera module is manufactured. Thus, this serial number is part of the camera module before the camera module is installed in the camera pod assembly 10 in step 304.

Step 306 is a pairing step to provide the security check element in the system calibration memory storage. The ECU 26 receives the serial number and calibration data information in step 302 from the at least two camera modules 12, 14 in the camera system 20 and the camera pod assembly 10 as a whole. In this form, the ECU 26 will receive a first serial number information from the first camera module 12, FIG. 2 and a second serial number from the second camera module 14. Further, the ECU 26 will receive the calibration data information, that may combine the calibration data information of each camera module 12, 14 as well as the camera system 20 as well as the camera pod assembly 10 as a whole. In certain embodiments the calibration data information may be separated.

In one embodiment, the serial number of all of the at least two camera modules 12, 14 are stored in a single Hash value H2 for the camera pod assembly 10. In this form, the camera pod assembly 10 is treated in the same way, as a single camera module as described in the various embodiments of this disclosure.

In one embodiment, the serial number of the camera module is converted into a new Hash value for the camera module. In this form, the first serial number from the first camera module 12 is converted into a Hash value called H12 and the second serial number for the second camera module 14 is converted into a Hash value H14. The Hash value may be a smaller portion of the camera serial number generated from the camera serial number received from the first camera module 12, FIG. 2 to create H12 or from the second camera module 14 to create H14.

Further, the at least one identification number of the calibration data may be converted into a new Hash value for the camera pod assembly 10. In case of several calibration data identification numbers, in certain embodiments several Hash values or one single combined Hash value may be created. The Hash value may be a smaller portion of a calibration data identification number generated from the calibration data identification number received from the calibration data to create the calibration data Hash value (H4).

The creation of the Hash values H12, H14 and of the calibration information for use in the verification step increases the security of the system. It is more difficult for an unauthorized user to determine the correct Hash value of the camera module and the calibration data than the camera module serial number and/or the calibration data identification number and this provides a first level of security. The created hash values are further encrypted with an encryption strategy. The encryption step of the Hash value H12, H14 and of the Hash values of the calibration information creates a second level of security for the camera system 20. Memory may be encrypted and cannot be read in blank text.

Once the hash values (e.g. H12, H14 or a calibration data information Hash value) have been created and encrypted, the system provides a third layer of security by storing the hash values (e.g. H12, H14 or a calibration data information Hash value) into the system calibration memory storage 28 of the paired camera modules 12, 14 in the camera system 20. The system additionally stores a combination of H12 and H14 into the memory of the ECU 26 for reference. In certain embodiments, the system additionally stores a combination of H12, H14 and at least one calibration data information Hash value into the memory of the ECU 26 for reference.

In a certain embodiment, with the first camera module 12, the second camera module 14, and the system calibration memory storage 28 of the hash values will function as follows:

The first camera module 12 stores
 the serial number from the first camera module 12, and
 H14,
and/or
the second camera module 14 stores
 the Serial number from the second camera module 14,
 H12
and/or
the ECU stores a value h3, which may be defined as follows:
 h3=Hash (Hash (Serial number first camera module 12)||Hash (Serial number second camera module 14))
 or
 h3=(H12)||(H14).

The cross storing of the camera module hash values in the paired camera module and in the ECU 26 provides a check of the camera modules 12, 14 in the camera system 20 and a third level of security for the camera system 20. In another form, the first camera module 12 and the second camera module 14 may also include storing of the Hash values for all camera modules in the camera system 20. In another form, the camera modules may store the hash values separately from the serial numbers.

In another embodiment with the first camera module 12 and the second camera module 14, the system calibration memory storage of the hash values will function as follows:

The first camera module 12 stores
 the serial number from the first camera module 12,
 H14, and
 at least one calibration data information Hash value,
and/or
the second camera module 14 stores
 the Serial number from the second camera module 14,
 H12, and
 at least one calibration data information Hash value,
and/or
the ECU stores a value h3, which may be defined as follows:
 h3=Hash (Hash (Serial number first camera module 12, at least one calibration data information)||Hash (Serial number second camera module 14, at least one calibration data information)) or
 h3=(H12, at least one calibration data information Hash value)||(H14, at least one calibration data information Hash value).

The cross storing of the camera module Hash values in the paired camera module and in the ECU 26 provides a check of the camera modules 12, 14 in the camera system 20 and a third level of security for the camera system 20. In an embodiment in which more than one calibration data information Hash values exist, e.g. one for each camera module, the cross storing of the Hash values can also be applied. In another embodiment, the first camera module 12 and the second camera module 14 may also include storing of the Hash values for all camera modules and calibration data information in the camera system 20. In another embodiment, the camera modules may store the hash values separately from the serial numbers and calibration data identification numbers.

In an embodiment, in Step 308, the ECU 26 may run a check on the camera modules and the calibration data to verify the stored Hash values in the first and second camera modules 12, 14. If the values returned from the first camera module 12, and the second camera module 14 match the expected Hash values stored in the ECU 26, the paired camera pod assembly 10 and its calibration data is verified. The verification of the calibration data may be implemented in that way, that in the camera pod assembly 10 and the ECU a set of calibration data is stored. Thus, the sent information about the calibration data from the camera pod assembly 10 has to meet the expected information of the calibration data stored in the ECU. The camera calibration is a match for the expected settings, and the camera system 20 function is confirmed to have been calibrated as a camera system 20 (Step 312). The memory of the ECU 26 and each camera module Hash value is encrypted and cannot be read in as blank text. For the validation, any camera in the camera pod assembly 10 may also be capable of cross-validate their pairing validation separately and not just validate from the ECU 26 alone. Once the first camera module 12 and the second camera module 14 have been paired and validated, the system has a means to verify that the first and second camera modules 12, 14 as well as the calibration data are the camera modules and calibration data present during calibration, respectively, to meet system regulations.

Figure 5:
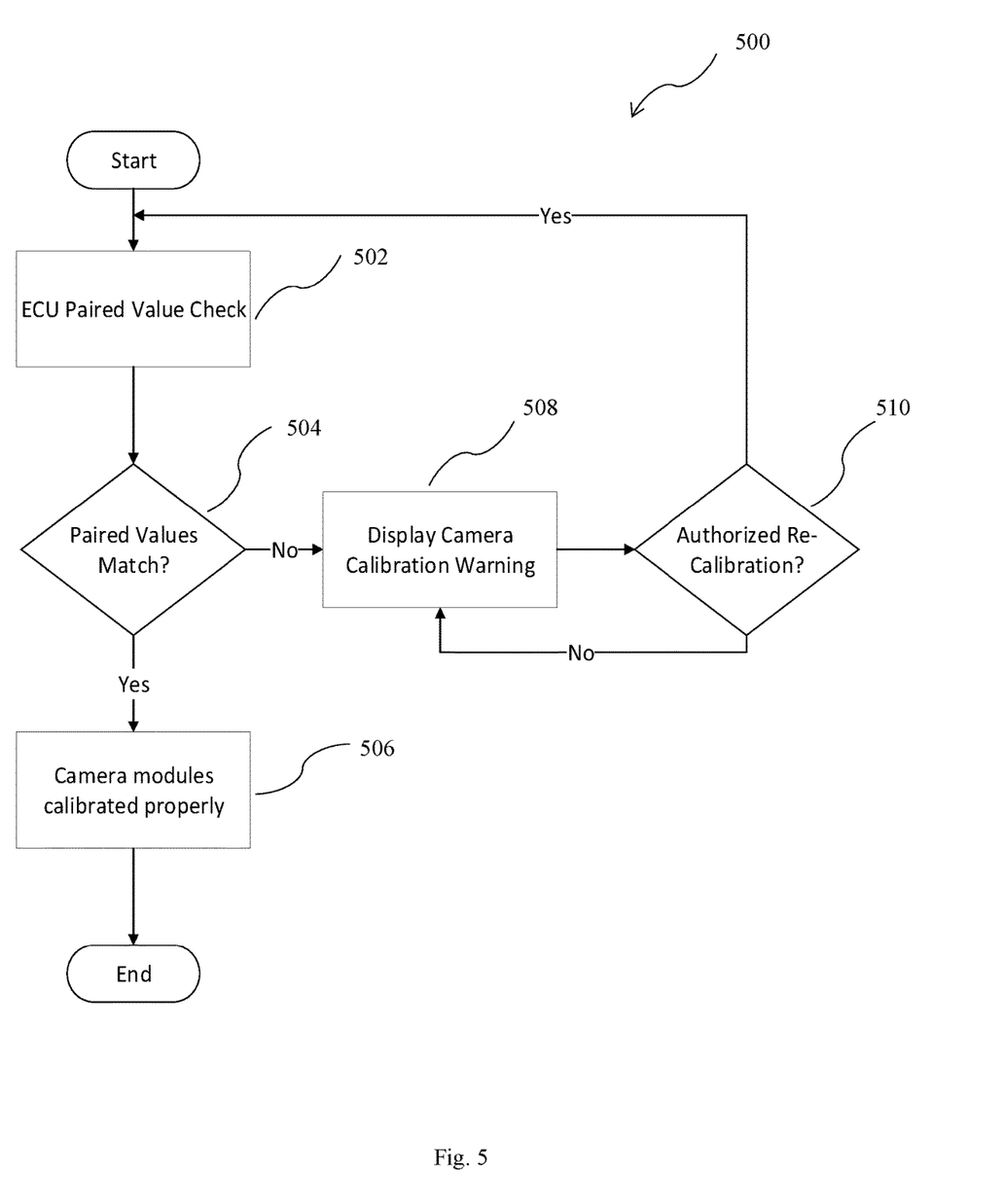
FIG. 5 illustrates an exemplary method for monitoring a camera monitoring system components for security parameters according to the present disclosure.

FIG. 5 illustrates an exemplary component validation monitoring process 500 for monitoring camera monitoring system components and calibration data for security parameters. This process acts to monitor the individual camera modules and calibration data in the camera pod assembly 10 and verifies that the calibrated first and second camera modules 12, 14 are the correct camera modules including the correct calibration data paired by an authorized calibration process. The component validation monitoring process 500 may be run at any time to verify the installed camera modules. An exemplary time to execute the component validation monitoring process 500 would be at vehicle start-up to detect any potential changes to any camera module in the system or within a service mode during any repairing. In this form, the component verification process would check to verify if either the first and/or second camera modules 12, 14 have been changed and/or updated calibration data is available.

In step 502, the ECU 26 may send a query to the camera modules to verify the stored Hash values from the other camera modules in the calibrated system. In this form, the H14 value will be verified from the first camera module 12 and the H12 value will be verified from the second camera module 14. The ECU 26 will compare the received H12 value (from second camera module 14) and H14 value (from first camera module 12) to the stored values of H3 in the ECU 26 in step 504. If the hash values are a match to the stored hash values in the ECU, no changes are detected to the camera modules and the camera modules are designated calibrated properly in step 506.

In an alternative, of step 502, the ECU 26 may send a query to the camera modules to verify the stored Hash values from the other camera modules in the calibrated system as well as the hash values of the calibration data. In this form, the H14 value as well as at least one calibration data Hash value (H4) from the second camera module 14 will be verified from the first camera module 12 and the H12 value as well as at least one calibration data Hash value (H4) from the first camera module 12 will be verified from the second camera module 14. The ECU 26 will compare the received values to the stored values of H3 in the ECU 26 in step 504. If the Hash values are a match to the stored Hash values in the ECU, no changes are detected to the camera modules as well as the calibration data and the camera modules are designated calibrated properly in step 506.

In another alternative of step 502, the ECU 26 may send a query to the camera modules to verify the stored Hash values from the calibration data. In this form, the at least one calibration data Hash value (H4) from the second camera module 14 will be verified from the first camera module 12 and the at least one calibration data Hash value (H4) from the first camera module 12 will be verified from the second camera module 14. The ECU 26 will compare the received values to the stored values of H3 in the ECU 26 in step 504. If the Hash values are a match to the stored Hash values in the ECU, no changes are detected to the camera modules as well as the calibration data and the camera modules are designated calibrated properly in step 506.

Step 508 initiates launching of a camera calibration warning to the user. If the hash values returned from either the first camera module 12 or the second camera module 14 and the ECU 26 during the validation step 504 do not match with the expected hash values, the system is alerted that tampering, camera malfunction, calibration data change or camera module replacement may have occurred. In certain embodiments the warning may give advice to the vehicle user by delivering information such as "please update the system", "please download an update", "please plug in the appropriate storage device to update the calibration data", "please use the service app and follow the "update calibration data of the camera system installation", "please use a certain display, which is connected to the vehicle, and follow the steps of calibration data update setting" or "please connect an appropriate device via Bluetooth, NFC or similar standards to the car and perform a calibration data update". A detected change may affect the overall calibration and image display of the system. In an embodiment, when a camera module is replaced, the information stored in that camera module is lost; so the stored hash values would not be found in an unauthorized replacement or a compromised camera module. After the system determines a validation error, a display warning will be switched on to be displayed (Step 508). This warning could be displayed to the vehicle operator in one or many locations in the vehicle 18. The display location may include a heads up display, the center console, the instrument panel, any exterior or interior display surface, or mobile device alert. This display will notify the vehicle user that a camera calibration issue has been found which may affect the function and security of the camera system 20. This warning may also direct the user to follow up with an authorized service technician. This warning may remain visible until the system has been properly recalibrated and the hash values match in the validation step (Step 510).

In accordance with the above described method, a change of the calibration data or an update of the calibration data follows the same calibration data respective logic. In Step 510, an authorized service person will be able to determine validation issue problem, whether it is camera module malfunction or if the camera module and/or the calibration data has been replaced and/or updated. A secondary calibration of the camera system 20 can then be implemented to correct the issue and create a new pairing between the camera modules and the ECU 26.

In an embodiment, after a replacement of the camera pod assembly, the new calibration data are already stored on the newly delivered camera pod assembly 10. Thus, the new calibration data are transferred on the ECU 26, to provide the same calibration data on both, the camera pod assembly 10 and the ECU 26. The transfer may be carried out by an external storage device, which will be plugged into an interface of the storage device integrated in the ECU 26; by wireless transfer e.g. Wi-Fi, Bluetooth, NFC or similar standards wherein an respective transfer device is attached to the ECU 26 or any other element of the vehicle, wherein the ECU 26 is connected with this element; by connecting the ECU with a mobile device, e.g. a smartphone, and transferring the calibration data; by connecting the ECU with the mobile internet access of a vehicle to obtain the new calibration data; by an data transfer device or interface, which is connected to the ECU 26; by transferring the data wireless from an storage device (e.g. RFID, NFC) of the camera pod assembly 10 to the storage device integrated in the ECU 26. In another embodiment the calibration data are stored on a cloud and every starting of the vehicle, the ECU 26 and the camera pod assembly 10 connect to the cloud and download the appropriate calibration data.

In a further embodiment, a calibration update may be needed without replacing a physical element. The information about the need to update the calibration data may be provided by an authorized service provider or technician or by transferring this information to the user or by transferring this information to the vehicle or by a combination of these. The calibration data update has to be performed on both ECU 26 and storage of the camera pod assembly 10. The transfer of the calibration data can be carried out by an external storage device, which will be plugged into an interface of the storage device integrated in the ECU 26 and the storage of the camera pod assembly 10; by wireless transfer e.g. Wi-Fi, Bluetooth, NFC or similar standards wherein a respective transfer device is attached to the ECU 26 or the camera pod assembly 10 or any other element of the vehicle, wherein the ECU 26 and the storage of the camera pod assembly 10 is connected with such an element; by connecting the ECU or storage of the camera pod assembly 10 with a mobile device, e.g. a smartphone, and transferring the calibration data; by connecting the ECU or storage of the camera pod assembly 10 with the mobile internet access of a vehicle to obtain the new calibration data; by an data transfer device or interface, which is connected to the ECU 26 or storage of the camera pod assembly 10; by transferring the data wireless from an storage device (e.g. RFID, NFC) to the storage device integrated in the ECU 26 or storage of the camera pod assembly 10. In another embodiment the updated calibration data is stored on a cloud and by starting the vehicle, the ECU 26 and the camera pod assembly 10 connect to the cloud and download the appropriate updated calibration data. Any further combination of the mentioned approaches can also be possible.

In step 510, the vehicle may be taken to the authorized service provider capable of running the validation calibration process 301 or a repair as well as update calibration. The authorized calibration repair version may be different than the component validation calibration process 301. The authorized calibration repair version will include the steps for pairing camera modules in the camera pod assembly 10 for image quality and creating and setting of the hash value security system in the at least two camera modules and the ECU 26.

Figure 6:
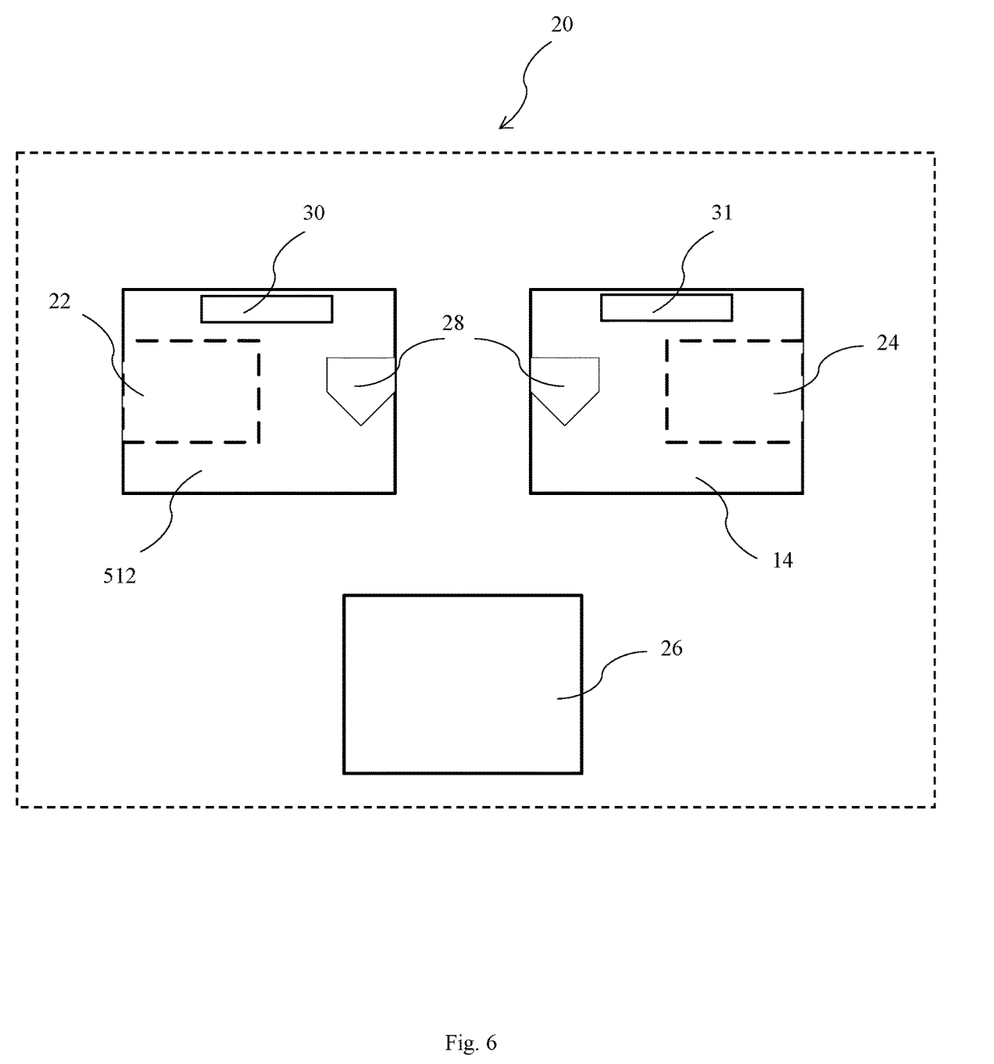
FIG. 6 schematically illustrates an example of the components of the camera system with a replacement camera module according to the present disclosure.

In an exemplary case shown in FIG. 6, the first camera module 12 is replaced with a replacement camera module 512, the H12 value as well as the calibration data Hash value (H4) stored in the ECU 26 and in the second camera module 14 would not be matched with a Hash value from a replacement camera module 512. When a missing or incorrect Hash value is detected, this will flag the system during monitoring to display a warning that the camera system 20 has been changed and a recalibration ensures that the displayed images meet safety regulations. The warning will be displayed until the authorized re-calibration is performed. During the authorized re-calibration, a new hash value H512 and a calibration data Hash value (H4) will be created from the replacement camera module 512 (replacement for the first camera module 12). These new hash values H512 and calibration data Hash value (H4) will then be stored in the ECU 26 and in the second camera module 14. In this form the security portion of the recalibration for the replacement camera module 512 would be as follows:

The replacement camera module 512 stores
   the serial number from the replacement camera module 512,
   H14, and
   at least one calibration data information Hash value (H412)
and/or
the second camera module 14 stores
   the serial number from the second camera module 14,
   H512, and
   at least one calibration data information Hash value (H412)
and/or
the ECU 26 stores a value h3, which may be defined as follows:
   h3=Hash (Hash (Serial number replacement camera module 512, at least one calibration data information H412)||Hash (Serial number second camera module 14, at least one calibration data information H412))
   or
   h3=(H512, Hash (at least one calibration data information))||(H14, Hash (at least one calibration data information)).

In another form if more than one camera module were replaced, the process would create and store new Hash values for each replaced camera module and the respective calibration data information. The recalibration process would also include a portion to align the camera images into a compliant image.

Figure 7:
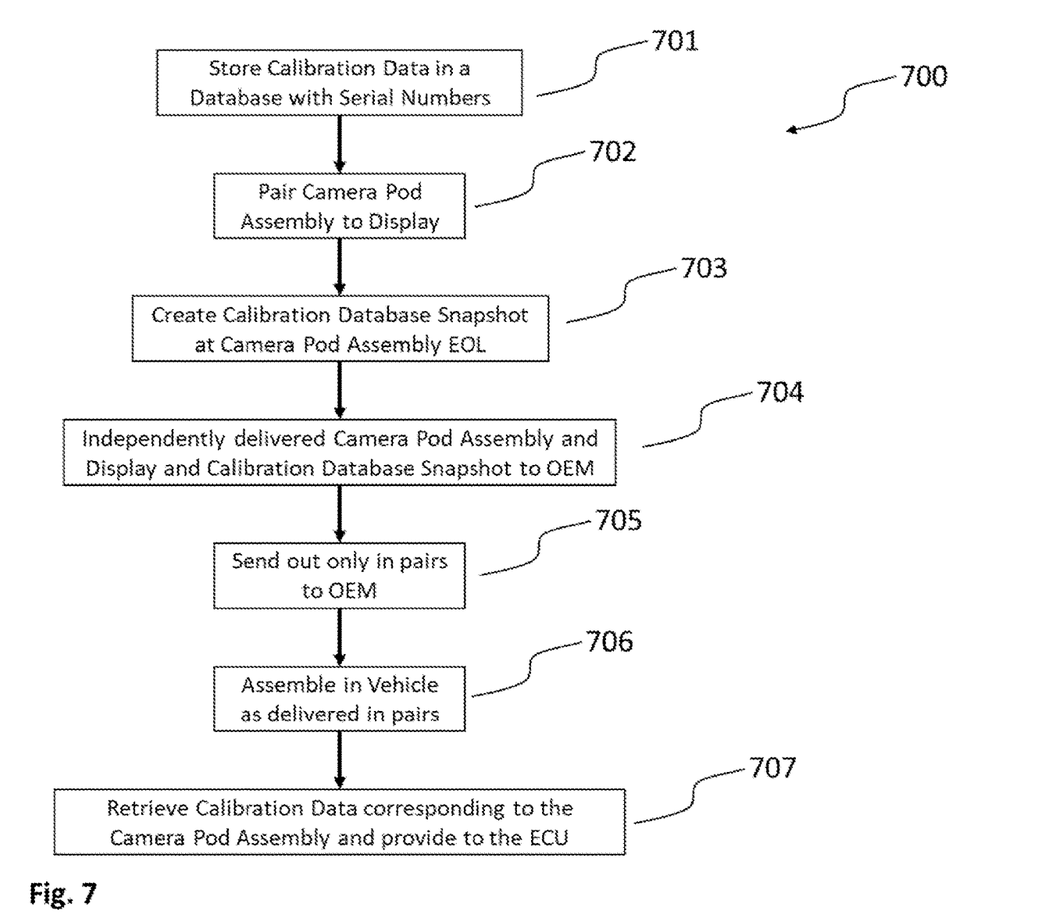
FIG. 7 illustrates an exemplary method for calibrating a camera pod assembly and an ECU by means of a database.

In an exemplary case shown in FIG. 7, a camera pod assembly 10 is to be extrinsically calibrated and to be assembled in a vehicle 18 without transferring the calibration data via a coaxial cable from the camera pod assembly 10 to the ECU 26. The extrinsic calibration between the vehicle and the camera pod assembly 10 starts with storing the calibration data in a database in a step 701 together with the related serial numbers of the elements of the camera pod assembly. Afterwards, in a step 702, a pairing between the display and the camera pod assembly 10 takes place. Based on this information, the related database snapshot is created (step 703) at the end of line (EOL) for the respective camera pod assembly. From now on, the camera pod assembly and the database snapshot are linked by e.g. a calibration data number in order to ensure that the pairing between the camera pod assembly and the respective database snapshot will not be separated. Both, the hardware comprising the camera pod assembly 10 and the display unit (not shown) as well as the calibration data by means of the database snapshot are delivered independently in step 704 to the OEM., In Step 705 it is ensured that the OEM receives identifiable pairs of hardware and data Due to the calibration data number, the pairing of the data and the hardware is ensured even during the assembly in the vehicle (step 706). In step 707, the OEM retrieves the calibration data corresponding to the camera pod assembly 10 and provides the respective calibration data to the ECU 26. In this form, the calibration data is stored permanently in both, the camera pod assembly 10 and the ECU 26. In order to ensure a proper operation of the system, it is only needed to exchange information about the camera pod assembly 10 and the calibration data, but no transfer of the calibration data as such.

Figure 8:
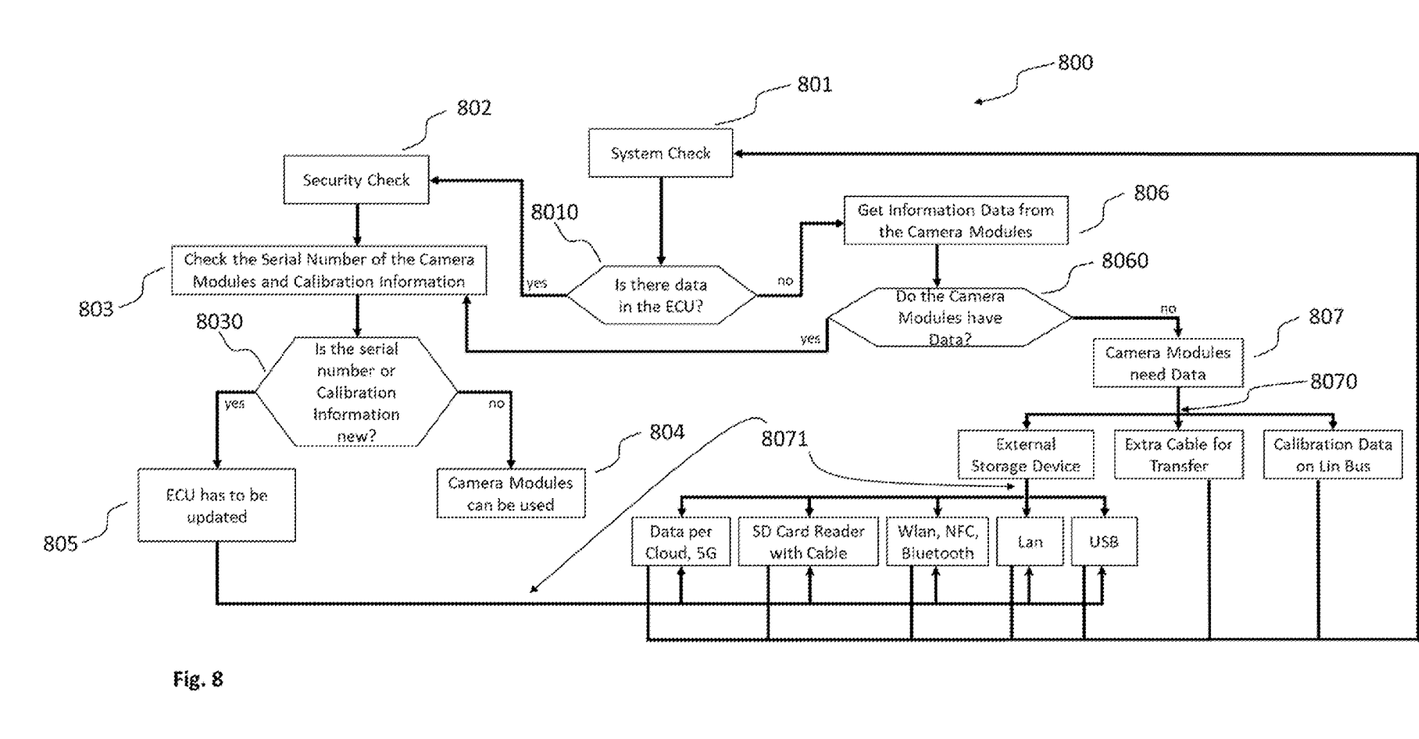
FIG. 8 illustrates an exemplary method for recalibrating the ECU without transferring the calibration data from a camera pod assembly by a coaxial cable.

FIG. 8 illustrates an exemplary embodiment of a method for recalibrating the ECU 26. After the pairing of the camera modules has been successfully conducted (e.g. in line with step 306), a system check (step 801) is carried out to ensure that the elements of the camera pod assembly 10, the display unit and the ECU 26 fit together and are connected properly. At the end of the system check in step 801, it is verified within the step 8010 whether the calibration data is in the ECU 26 or not. In the case there is calibration data in the ECU 26, a security check step 802 is carried out subsequently, in order to identify data security breaches. Then, the serial numbers of the camera modules and information about the calibration data (e.g. identification number) are checked in step 803 and compared to the ones in the ECU 26 in step 8030. If the information is the same, the camera modules can be used (step 804). If the information is not the same, in certain embodiments warnings will show up (such as a warning box on the display unit with the following text "Please update the calibration data of your vehicle") and the ECU 26 has to be updated in step 805 with the respective calibration data being the appropriate information of the camera modules. Until the calibration data is not updated, the warnings may remain visible. In order to update the ECU 26, the calibration data can be transferred to the ECU 26 via different wireless connections in step 8071 (such as Wlan, 5G or NFC standards) or via wired connections that may be directly or indirectly connected to the ECU 26. In certain embodiments of the present disclosure, the ECU 26 may have a single or several interfaces to receive the calibration data. After the data has been transferred to the ECU 26, the method returns to the step 801 and verifies subsequently, that the appropriate calibration data is now on both, the camera pod assembly 10 and the ECU 26.

In another alternative of the method according to FIG. 8 there are no data on the ECU 26 found in the system check step 801. In this case, the method continues with step 806, wherein the ECU 26 tries to get the information data about the camera pod assembly 10 (e.g. serial numbers) and the calibration data (e.g. calibration identification number). If in step 8060 the camera does have information data, the method continues with step 803 as described above and updates the ECU 26. If in step 8060 the camera does not have information data, the camera needs to get the appropriate data in step 807, which can be transferred via different options of step 8070, e.g. via an extra data transfer cable, Lin Bus connection or any external storage device connected to the ECU 26 via a wireless standard or wired connection in step 8071. Afterwards, the method continues with step 801 and follows the steps as described above.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features disclosed in the foregoing description, in the drawings and in the claims can be essential individually and in any combination for the implementation of the disclosure in its various embodiments.

REFERENCE SIGN LIST

10—Camera Pod Assembly
12—First Camera Module
14—Second Camera Module
16—Mounting Element
18—Vehicle
20—Camera System
22—First Camera Flash Memory
24—Second Camera Flash Memory
26—Electronic Control Unit (ECU)
28—System Calibration Memory Storage
30—First Lens System
31—Second Lens System
100—Vehicle Camera System Calibration Method
200—Camera Calibration Process
300—Camera System Calibration Process
301—Validation Calibration Process
302—Individual Camera Modules Stored Assigned Serial Numbers
304—Camera Modules Are Installed in a Camera System
306—Cross-Validate Camera Pairing
308—ECU Checks Stored Pairing Values
310—Values Match?
312—Camera Modules Calibrated Properly
400—Vehicle CMS Calibration Process
500—Component Validation Monitoring Process
502—ECU Checks Stored Pairing Values
504—Values Match?
506—Camera Modules Calibrated Properly
508—Display Camera Calibration Warning
510—Authorized Re-Calibration
512—Replacement Camera Module
700—Extrinsic Calibration Process
701—Storing Calibration Data
702—Paring of the Camera Pod Assembly and Display
703—Creation of Calibration Database Snapshot
704—Independent Delivery
705—Sending out in Pairs
706—Assembly in Vehicle
707—Retrieving and Providing Calibration Data
800—Recalibration Process without Coaxial Cable
801—System Check
802—Security Check
803—Check the Information Data
804—Camera can be used
805—ECU has to be Updated
806—Get Camera Information
807—Camera needs Data
8010—Decision: Is there Data in the ECU?
8030—Decision: Is the serial number or Calibration Information new?
8060—Decision: Does the Camera have Data?
8070—Data Transfer Options
8071—Data Transfer Options by external Storage device
H12—First Camera Module Hash Value
H14—Second Camera Module Hash Value
H2—Camera Pod Assembly Hash Value
H3—ECU Stored Hash Value
H4—Calibration data Hash Value
H412—New Calibration Data Hash Value of the Replacement Camera Module
H512—Replacement Camera Module Hash Value

The invention claimed is:

1. A security setting method for a camera system of a vehicle, wherein the camera system includes a first camera module with a first identification number, a second camera module with a second identification number, and an electronic control unit (ECU), the security setting method comprising:
generating a first camera module hash value for the first identification number;
generating a second camera module hash value based on the second identification number;
generating a camera pod assembly hash value based on the first and second identification numbers;
storing one or more of the first camera module hash value, the second camera module hash value, or the camera pod assembly hash value using a storage method that comprises one or more of,
storing the first hash value in the second camera module and the second hash value in the first camera module,
storing the camera pod assembly hash value in a camera pod assembly,
storing the first hash value and the second hash value as a pair, or
storing the first hash value and the second hash value in the ECU as an ECU hash value.

2. The security setting method of claim 1, further comprising:
encrypting at least one of the first camera module hash value, the second camera module hash value, the camera pod assembly hash value, or ECU hash value before storing.

3. The security setting method of claim 1, further comprising:
monitoring and/or validating the first hash value stored in the second camera module and the second hash value stored in the first camera module by matching with the ECU hash values stored in the ECU.

4. The security setting method of claim 1, further comprising:
transferring calibration data to one or more of the camera pod assembly, the camera modules, or the ECU, wherein the transfer is via a wireless or wired connection.

5. The security setting method of claim 3, wherein the validating occurs at vehicle start-up.

6. The security setting method of claim 4, wherein the calibration data of the transferring step are defined by an assigned calibration data set per one or more of the camera module or the camera pod assembly, and wherein each calibration data set is assigned to a specific calibration data identification number.

7. The security setting method of claim 4, transferring is performed using a data transfer interface, which enables data transfer standards in form of NFC, WLan, 5G, USB, Lin Bus, storage reader, Bluetooth, or LAN.

8. The security setting method of claim 1, further comprising:
displaying a warning if the ECU hash values do not match the first and second hash values.

9. The security setting method of claim 6, further comprising:
creating a calibration data hash value for the calibration data identification number; and
storing the calibration data hash value in at least one of the ECU, the first and second camera modules, or the camera pod assembly.

10. The security setting method of claim 9, further comprising:
displaying a warning if the calibration data hash value stored in at least one of the first and second camera modules or the camera pod assembly does not match the calibration data hash value stored in the ECU.

11. The security setting method of claim 1, further comprising:
storing a calibration data set in a storage device; and
providing the camera pod assembly and the calibration data set to an OEM.

12. The security setting method of claim 11, wherein the storage device is selected to comprise one or more of a cloud, a flash drive, a hard disk, a CD, a DVD, a printable Code, a chip or a mobile device.

13. The security setting method of claim 1, wherein at least one of the hash values comprises a plurality of identification numbers, hash values, partial identification numbers, or partial hash values.

14. The security setting method of claim 6, wherein the first and second hash values include addition information about the calibration data set.

15. The security setting method of claim 6, wherein the first and second hash values comprise at least two hash values, wherein a first hash value determines hardware modules of the camera pod assembly and a second hash value determines the calibration data set.

16. The securing setting method of claim 3, wherein the matching performed during the step of monitoring and/or validating is further based on a calibration data hash value, wherein the calibration data hash value is stored at least partly in the ECU or in at least one of the camera modules or the camera pod assembly.

17. The securing setting method of claim 8, wherein the matching performed during the step of displaying a warning is further based on a calibration data hash value, wherein the calibration data hash value is stored at least partly in the ECU or at least one of the camera modules or the camera pod assembly.

18. The security setting method of claim 4, wherein the transferring of the calibration data is in form of a wireless transfer from the camera pod assembly to the ECU.

19. The security setting method claim 3, further comprising:
checking for calibration data updates, wherein a warning is displayed if a calibration data update is available, and
transferring a new calibration data set to at least one of the camera pod assembly, the first and second camera modules, or the ECU as an update.

20. The security setting method of claim 1, wherein the camera system includes more than two camera modules and calibration data sets, for which respective hash values are created, stored, monitored and validated.

21. The security setting method of claim 1, wherein at least two hash values are combined into a single hash value or a defined list of hash values.

22. The security setting method of claim 6, wherein at least one of the hash values comprises information about the stored calibration data set.

23. The security setting method of claim 1, wherein at least one identification number is a serial number.

24. The security setting method of claim 6, further comprising:
storing at least one calibration data hash value in each camera module, wherein the calibration data hash values are cross stored in the camera modules such that each camera module has stored a calibration data hash value that relates to another camera module.

25. The security setting method of claim 1, wherein the method provides a system calibration method for the camera system, comprising
a step for individual camera module calibration,
a step for camera system calibration, and
a step for vehicle camera calibration.

26. The security setting method of claim 25, wherein the step for camera system calibration comprises:
storing assigned serial numbers of individual camera modules,
installing the camera modules in the camera system,
cross-storing and/or cross-validating the camera module pairing,
checking the existence of stored pairing values,
matching the hash values, and
assigning the camera modules as calibrated.

27. The security setting method of claim 1, wherein the method is adapted for monitoring camera monitoring system components for security parameters, comprising
checking for stored pairing hash values,
matching the hash values, and
assigning the camera modules as calibrated, or displaying a camera calibration warning, or authorizing a re-calibration, wherein the method is subsequently returned to the step for checking for stored pairing hash values.

28. A security setting method of claim 1, wherein at least one camera module or a camera pod assembly is replaced by a method comprising,
replacing at least one camera module or camera pod assembly,
creating a new hash value of the replacement camera module or creating a new hash value of the replacement camera pod assembly,
creating new calibration data hash value of the replacement camera module or the replacement camera pod assembly, and
replacing old calibration data and hash values with the new hash values of the replacement camera module or the replacement camera pod assembly.

29. A security setting method of claim 1, wherein the method is adapted for calibrating a camera pod assembly and an ECU by using a database, comprising
storing the calibration data,
pairing the camera modules of the camera pod assembly,
creating a calibration database snapshot,
delivering the paired camera pod assembly, a display unit and the calibration database snapshot,
sending out information on the pairing of the camera pod assembly and the display unit with the database snapshot, and
retrieving calibration data from the database snapshot and providing the same to the ECU.

30. The security setting method of claim 1, wherein a recalibration without transferring calibration data from the camera pod assembly by a coaxial cable, comprises:
checking for the camera system,
checking for existence of data on the ECU, checking security of the camera system in case there are data on the ECU, or obtaining information data from the camera modules in case there are no data on the ECU but on the camera modules and providing calibration data to the camera modules by wired or wireless connection, checking serial numbers of the camera modules and/or the camera pod assembly, and updating calibration data of the ECU by providing the calibration data to the ECU in case there are new serial numbers of the camera modules and/or the camera pod assembly, or using the camera modules without update in case there are no new serial numbers of the camera modules and/or the camera pod assembly.

31. The security setting method of claim 30, wherein the method is subsequently returned to the step of checking the camera system and the step of checking the existence of data on the ECU.

32. A camera pod assembly comprising at least two camera modules to be attached to a vehicle via a mounting and being adapted for usage of the security setting method of claim 1.

33. The camera pod assembly of claim 32, wherein the storage device has a flash drive, a hard disk, a CD, a DVD, a printable code, or a chip.

34. A camera system comprising at least one camera pod assembly of claim 32 and the ECU.

35. The camera system of claim 34, wherein the storage device is provided by a cloud or a mobile device.

36. A vehicle comprising the camera system of claim 34 and at least one display unit.

37. The vehicle of claim 36, wherein the ECU is provided by the display unit.

38. A security setting method for a camera system of a vehicle, wherein the camera system includes a first camera module with a first identification number, a second camera module with a second identification number, and an electronic control unit (ECU), the security setting method comprising:
generating a first camera module hash value for the first identification number;
generating a second camera module hash value based on the second identification number;
storing one or more of the first camera module hash value or the second camera module hash value using a storage method that comprises one or more of,
storing the first hash value in the second camera module and the second hash value in the first camera module,
storing the first hash value and the second hash value as a pair, or
storing the first hash value and the second hash value in the ECU as an ECU hash value.

39. The security setting method of claim 38, further comprising:
encrypting at least one of the first camera module hash value, the second camera module hash value, or ECU hash value before storing.

40. The security setting method of claim 38, further comprising:
monitoring and/or validating the first hash value stored in the second camera module and the second hash value stored in the first camera module by matching with the ECU hash values stored in the ECU.

41. The security setting method of claim 38, further comprising:
transferring calibration data to one or more of a camera pod assembly, the camera modules, or the ECU, wherein the transfer is via a wireless or wired connection.

42. The security setting method of claim 40, wherein the validating occurs at vehicle start-up.

43. The security setting method of claim 41, wherein the calibration data of the transferring step are defined by an assigned calibration data set of at least one of the camera modules, and wherein each calibration data set is assigned to a specific calibration data identification number.

44. The security setting method of claim 38, further comprising:
displaying a warning if the ECU hash values do not match the first and second hash values.

45. The security setting method of claim 43, wherein the first and second hash values include addition information about the calibration data set.

46. The security setting method of claim 38, wherein the method provides a system calibration method for the camera system, comprising
a step for individual camera module calibration,
a step for camera system calibration, and
a step for vehicle camera calibration.

47. The security setting method of claim 46, wherein the step for camera system calibration comprises:
storing assigned serial numbers of individual camera modules,
installing the camera modules in the camera system,
cross-storing and/or cross-validating the camera module pairing,
checking the existence of stored pairing values,
matching the hash values, and
assigning the camera modules as calibrated.

48. The security setting method of claim 38, wherein the method is adapted for monitoring camera monitoring system components for security parameters, comprising
checking for stored pairing hash values,
matching the hash values, and
assigning the camera modules as calibrated, or displaying a camera calibration warning, or authorizing a re-calibration, wherein the method is subsequently returned to the step for checking for stored pairing hash values.

49. A security setting method of claim 38, wherein at least one camera module is replaced by a method comprising,
replacing at least one camera module,
creating a new hash value of the replacement camera module,
creating new calibration data hash value of the replacement camera module, and
replacing old calibration data and hash values with the new hash values of the replacement camera module.

* * * * *